US012604887B2

(12) United States Patent
Dambra

(10) Patent No.: US 12,604,887 B2
(45) Date of Patent: Apr. 21, 2026

(54) BIRD DETERRENT

(71) Applicant: PIGEON FREE SYSTEM S.r.l., Pianoro (IT)

(72) Inventor: Domenico Dambra, Pianoro (IT)

(73) Assignee: PIGEON FREE SYSTEM S.r.l., Pianoro (IT)

( * ) Notice: Subject to any disclaimer, the term of this patent is extended or adjusted under 35 U.S.C. 154(b) by 172 days.

(21) Appl. No.: 18/573,806

(22) PCT Filed: Jun. 22, 2022

(86) PCT No.: PCT/IB2022/055786
§ 371 (c)(1),
(2) Date: Dec. 22, 2023

(87) PCT Pub. No.: WO2022/269506
PCT Pub. Date: Dec. 29, 2022

(65) Prior Publication Data
US 2024/0324585 A1 Oct. 3, 2024

(30) Foreign Application Priority Data

Jun. 25, 2021 (IT) ......................... 102021000016730

(51) Int. Cl.
*A01M 29/32* (2011.01)
*E04D 13/00* (2006.01)
(52) U.S. Cl.
CPC ........... *A01M 29/32* (2013.01); *E04D 13/004* (2013.01)
(58) Field of Classification Search
CPC ............................. A01M 29/32; E04D 13/004

USPC ............................................... 52/101; 256/11
See application file for complete search history.

(56) References Cited

U.S. PATENT DOCUMENTS

| | | | | |
|---|---|---|---|---|
| 168,446 | A | * 10/1875 | Blodget | ................ A01M 29/32 256/11 |
| 2,306,080 | A | 12/1942 | Peles | |
| 2,938,243 | A | * 5/1960 | Peles | ..................... A01M 29/32 256/11 |
| 3,407,550 | A | * 10/1968 | Shaw | ..................... A01M 29/32 256/11 |
| 4,165,672 | A | 8/1979 | Jureit et al. | |
| 4,404,778 | A | * 9/1983 | Ushimaru | ............. E04D 13/004 52/517 |
| 4,997,721 | A | * 3/1991 | Shaw | ..................... A01M 29/32 428/596 |

(Continued)

FOREIGN PATENT DOCUMENTS

| | | |
|---|---|---|
| DE | 203 06 137 U1 | 8/2004 |
| EP | 2 165 602 A1 | 3/2010 |
| GB | 2 396 093 A | 6/2004 |

*Primary Examiner* — Brent W Herring
(74) *Attorney, Agent, or Firm* — ASLAN LAW, P.C.

(57) ABSTRACT

A bird deterrent comprises a supporting device/structure/apparatus/element/unit/or the like associable with a holding surface; a plurality of blade elements arranged substantially side by side, made at least partly of substantially elastic material and comprising a first end, associated with the supporting device/structure/apparatus/element/unit/or the like, and a second free end provided with a pointed element, wherein the blade elements are flexible in a substantially elastic manner as a result of the support of a bird.

7 Claims, 3 Drawing Sheets

(56) References Cited

U.S. PATENT DOCUMENTS

| | | | | |
|---|---|---|---|---|
| 5,691,032 A | * | 11/1997 | Trueblood | A01M 29/32 |
| | | | | 83/40 |
| 2002/0073633 A1 | * | 6/2002 | Schlichting | A01M 29/32 |
| | | | | 256/11 |

* cited by examiner

BIRD DETERRENT

CROSS-REFERENCE TO RELATED APPLICATIONS

This application claims priority to IT Patent Application No. 102021000016730 filed on Jun. 25, 2021, and this application claims priority to and is a 371 of international PCT Application No. PCT/IB2022/055786 filed on Jun. 22, 2022, the entire contents of which are hereby incorporated by reference.

TECHNICAL FIELD

The present invention relates to a bird deterrent.

BACKGROUND ART

It is well known how the birds usually roost temporarily on man-made buildings and/or nest in them and may soil with their droppings the surfaces of objects with which they get in contact.

The presence of droppings in environments frequented by humans can lead to the rise of sanitary and/or hygienic and/or aesthetic problems that poorly mate with the performance of some human activities.

For these reasons, there is an increasing need to prevent birds from roosting on man-made buildings and/or artifacts in order to limit the presence of droppings on such architectural components.

To date, bird deterrents of mechanical type are known to be used, comprising steel structures provided with needles which are placed on the exterior surfaces of buildings and/or artistic artifacts such as, e.g., statues and/or sculptures of special value.

The function of the needles is to prevent birds from comfortably roosting thereon, so they are discouraged from standing on surfaces provided with deterrents.

Again, the use is known of bird deterrents of electric type comprising low-voltage electrified metal components.

In this case, when the birds rest on the electrified metal components, they are hit by small electric shocks which are harmless to the birds' safety but result in their escape.

Bird deterrents of known type do, however, have some drawbacks.

First, the presence of such bird deterrents results in a deterioration of the aesthetic appearance of the building and/or artistic work on which they are installed.

In fact, deterrents are visible from the outside and their presence is not particularly pleasing to the human eye, especially when installed on an artistic work.

Additionally, bird deterrents of mechanical type are in some cases used by birds as nesting support, thus increasing the presence of droppings on buildings resulting in worsening aesthetic and/or sanitary conditions.

In addition, the repeated exposure to the weather and/or the birds' droppings themselves leads to rapid wear and tear of bird deterrents which, therefore, need to be frequently maintained and/or replaced.

The construction and/or installation and/or maintenance of bird deterrents of the electric type turn out to be very expensive.

A different type of bird deterrents is also known which comprise a tilting surface associated with supporting means that allow it to swing freely as a result of a bird roosting on the tilting surface itself.

However, such deterrents cannot always be adapted to the different types of installation surfaces, particularly small or curvilinear surfaces.

DESCRIPTION OF THE INVENTION

The main aim of the present invention is to devise a bird deterrent which allows effectively responding to the health, environmental and aesthetic problem caused by bird droppings on buildings and/or artistic artifacts.

Another object of the present invention is to devise a bird deterrent which is easy to construct and install and does not require extensive maintenance work.

As part of this aim, the present invention aims to devise a bird deterrent which has high resistance to weathering and/or bird droppings.

In addition, another object of the present invention is to devise a bird deterrent which can be easily installed on surfaces having special geometries such as, e.g., curvilinear surfaces.

Another object of the present invention is to devise a bird deterrent which may overcome the aforementioned drawbacks of the prior art within the framework of a simple, rational, easy and effective to use as well as affordable solution.

The aforementioned objects are achieved by this bird deterrent having the characteristics of claim 1.

BRIEF DESCRIPTION OF THE DRAWINGS

Other characteristics and advantages of the present invention will become more apparent from the description of a preferred, but not exclusive, embodiment of a bird deterrent, illustrated by way of an indicative, yet non-limiting example in the accompanying tables of drawings in which.

EMBODIMENTS OF THE INVENTION

Figure 1:
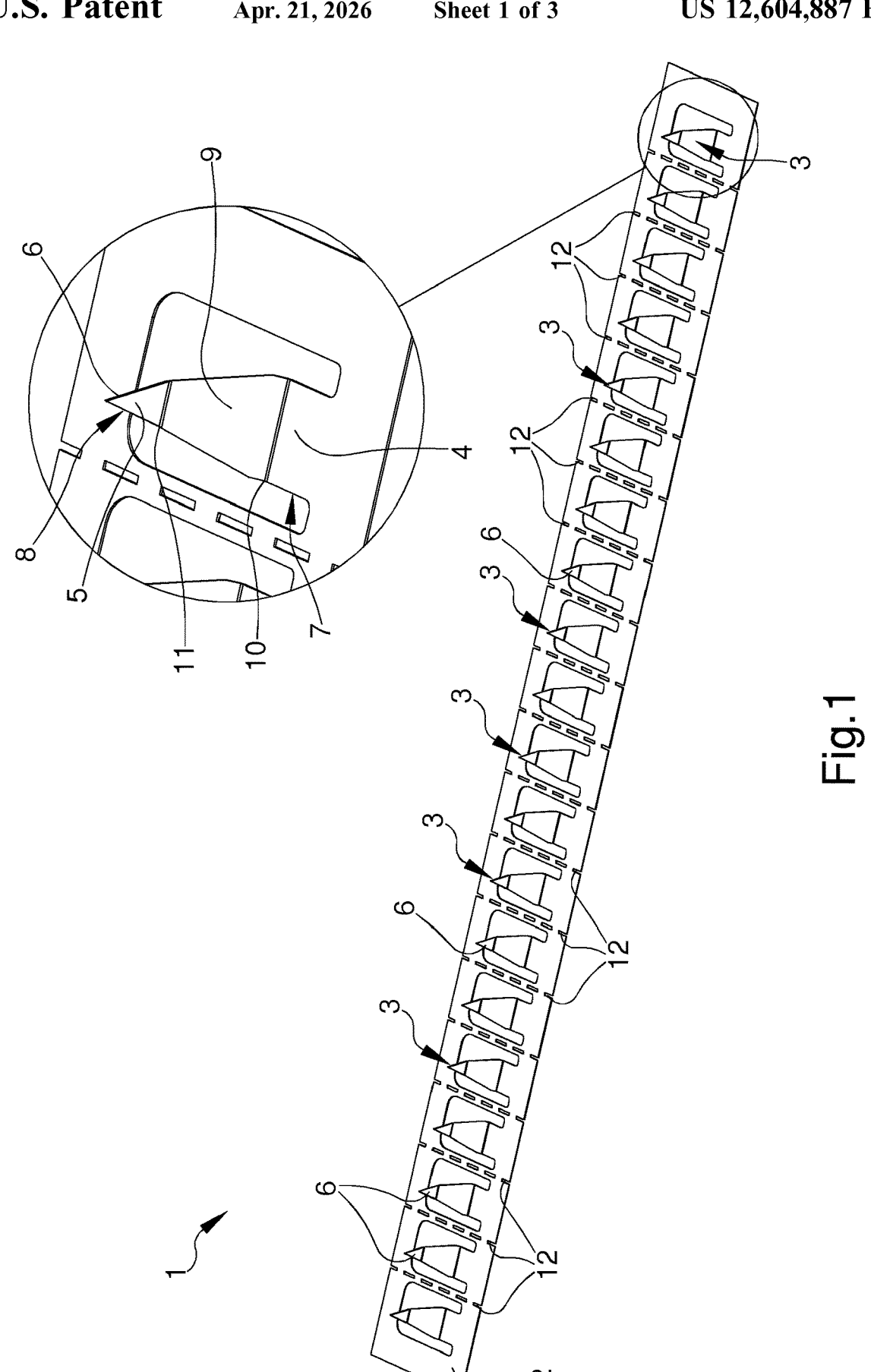
FIG. 1 is an axonometric, partly enlarged view of a deterrent according to the invention.

With particular reference to these figures, reference numeral 1 globally indicates a bird deterrent.

The deterrent 1 comprises supporting means 2 associable with a holding surface S.

The deterrent 1 can be installed on different types of building, and particularly, the holding surface S may have different nature and/or geometric conformation.

For example, the deterrent 1 may be installed on exterior architectural components of a building such as, e.g., a cornice and/or the parapet of a balcony.

In this case, the holding surface S coincides with the outer surface of the cornice and/or with the outer surface of the parapet.

Again, the deterrent 1 may be installed on an artistic artifact such as, e.g., a statue and, in this case, the holding surface S coincides with the outer surface of the statue itself.

Conveniently, the supporting means 2 comprise at least one basic element 2 which can be associated with the holding surface S by interposition of connection means.

Preferably, the basic element 2 has a substantially flat conformation and is placed resting on the holding surface S.

The connection means, which are not shown in the figures for ease of implementation, comprise bonding elements such as, e.g., glue or silicone.

Alternatively or in combination thereof, the connection means comprise fastening elements of the mechanical type such as, e.g., screws and bolts.

The deterrent 1 comprises a plurality of blade elements 3 arranged substantially side by side, made at least partly of a substantially elastic material and comprising at least a first end 4 associated with the supporting means 2 and at least a second free end 5 provided with at least one pointed element 6.

The blade elements 3 are flexible in a substantially elastic manner as a result of the support of at least one bird P.

Figure 3:
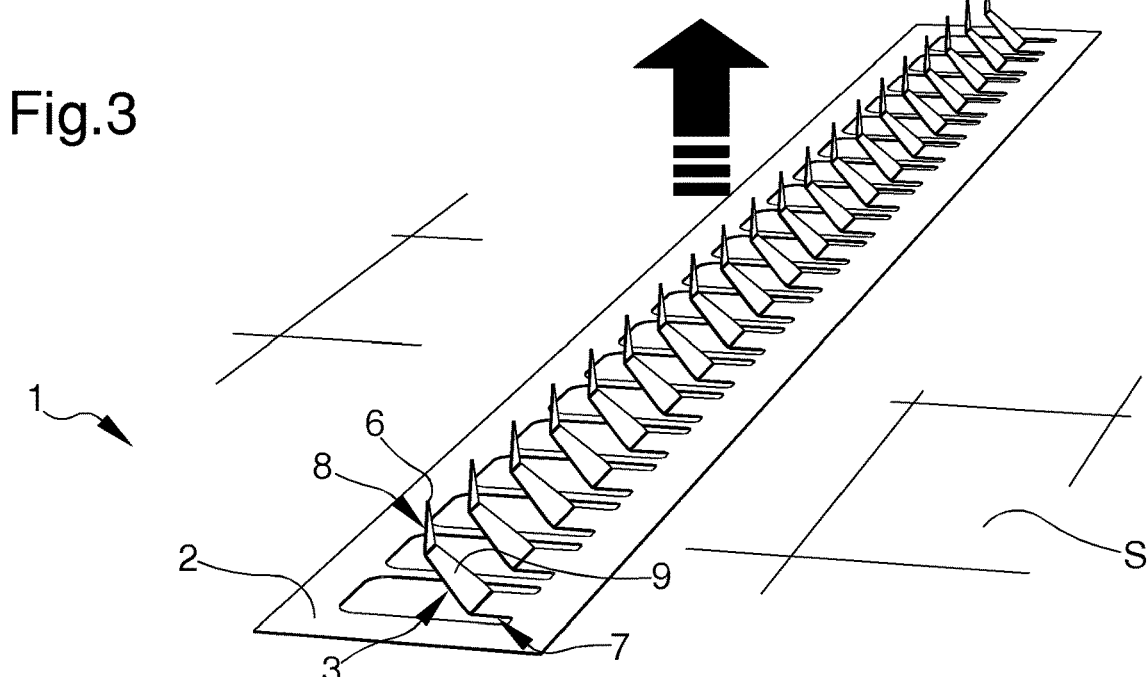
FIG. 3 is an axonometric view of the deterrent according to the invention in the home configuration.
Figure 4:
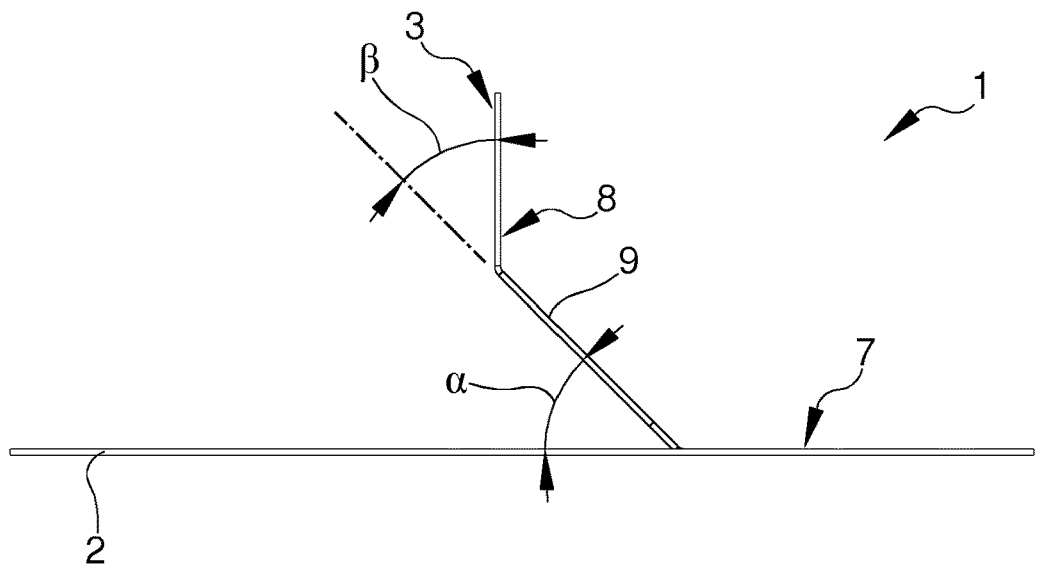
FIG. 4 is a side view of the deterrent according to the invention.

When the blade elements 3 are not stressed by external forces, the deterrent 1 is placed in a home configuration which is shown in FIG. 1 and FIG. 3.

Figure 2:
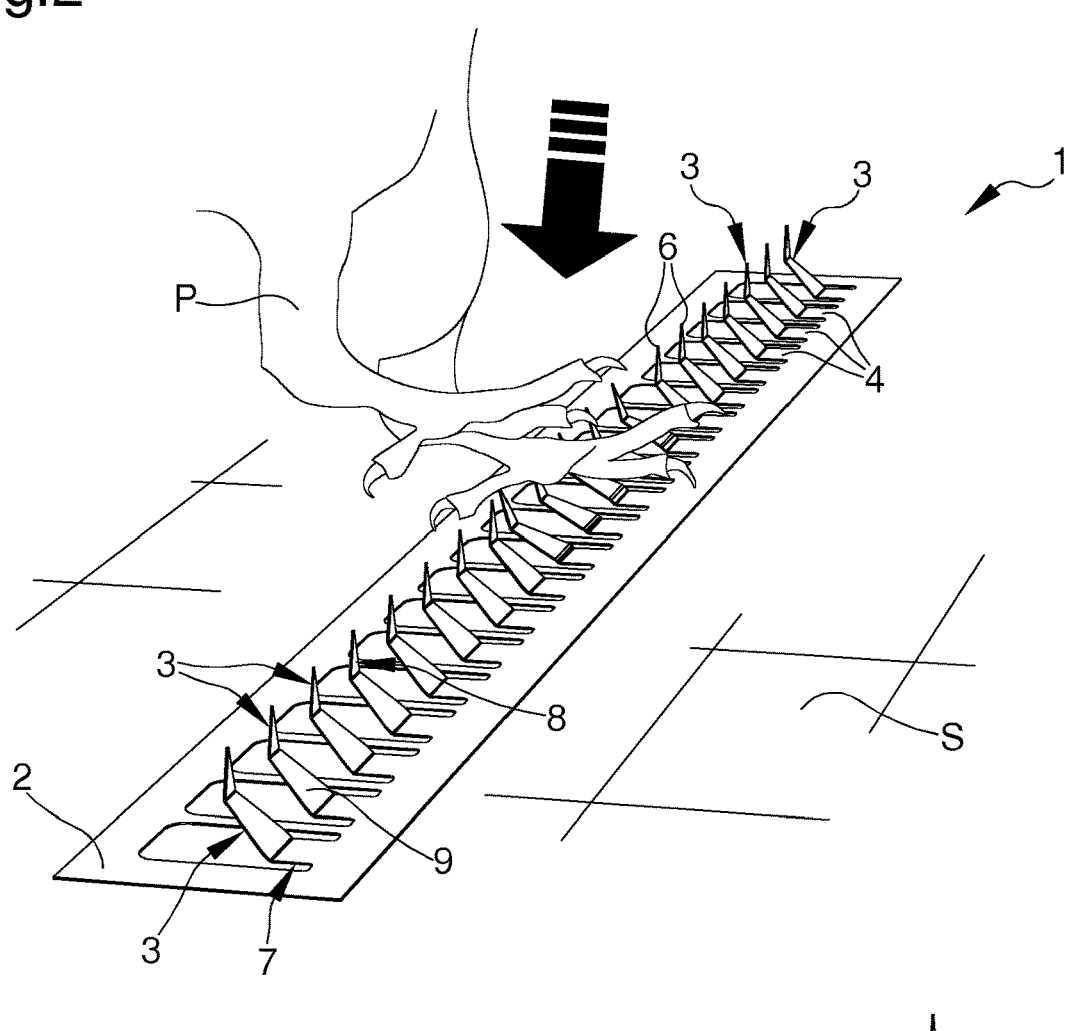
FIG. 2 is an axonometric view of the deterrent according to the invention in the working configuration.

As soon as the blade elements 3 are stressed by an external force such as, e.g., the weight of a bird P, they bend elastically and the deterrent 1 is placed in a working configuration (FIG. 2).

When the stress on the blade elements 3 is finished, that is, when the bird P moves away from the deterrent 1, the blade elements 3, being elastically deformable, return to the position before the stress, again placing the deterrent 1 in the home configuration, as shown in FIG. 3.

The elastic behavior of the blade elements 3 allows the definition of an unstable resting surface of the bird P that causes it to slip or, alternatively, induces the bird P itself to rise in flight thus moving away from the deterrent 1.

At the same time, the pointed elements 6 sting the bird P by annoying it and causing it to move away.

The special expedient of making the blade elements 3 of a substantially elastic material allows them to flex in a released manner, thus facilitating the positioning of the deterrent 1 in the working configuration and the return to the home configuration.

Preferably, the substantially elastic material is of a metallic type.

Particularly, the substantially elastic material is hardened steel.

According to a preferred embodiment, the hardened steel from which the blade elements 3 are made is an austenitic stainless steel alloy composed of between 16% and 18% chromium, between 11% and 14% nickel and between 2% and 3% molybdenum.

This type of hardened steels has a high degree of elasticity and high resistance to wear and corrosion, making them particularly suitable for installation outside the buildings, that is, in contact with the weather and/or bird droppings.

Preferably, steels used to make the blade elements 3 belong to the AISI 301 and AISI 316 categories.

Alternatively, the substantially elastic material is of the plastic type.

Particularly, the substantially elastic material is a synthesized polymeric material.

For example, the synthesized polymeric material used to make the blade elements 3 is of the polycarbonate or Acrylonitrile Butadiene Styrene (ABS) type.

Conveniently, each of the blade elements 3 comprises:

at least one basic portion 7 provided with the first end 4 and substantially coplanar to the basic element 2;

at least one extreme portion 8 provided with the second end 5 and with the pointed element 6;

at least one connecting portion 9 between the basic portion 7 and the extreme portion 8;

wherein the connecting portion 9 is inclined with respect to the basic portion 7 by a first angle $\alpha$, substantially equal to 45°, and the extreme portion 8 is inclined with respect to the connecting portion 9 by a second angle $\beta$, substantially equal to 45°.

In other words, the connecting portion 9 and the extreme portion 8 extend on relevant bedding planes substantially transverse to the bedding plane of the basic portion 7, when the deterrent 1 is in the home configuration.

Particularly, the extreme portion 8 of each blade element 3 and, consequently, each pointed element 6 is substantially perpendicular to the basic portion 7.

In this way, when the bird P rests on the deterrent 1 the pointed elements 6 substantially face the bird P, consequently maximizing the effectiveness of the deterrent 1.

Preferably, each of the blade elements 3 comprises:

at least a first bending line 10, positioned between the basic portion 7 and the connecting portion 9;

at least a second bending line 11, positioned between the connecting portion 9 and the extreme portion 8;

wherein the first bending line 10 and the second bending line 11 are adapted to promote bending of the blade elements 3 when contacted by the bird P.

In other words, when making the deterrent 1, as will be detailed below, each blade element 3 is first bent along the first bending line 10 and, then, along the second bending line 11, thus defining the basic portion 7, the connecting portion 9 and the extreme portion 8.

The first bending line 10 and the second bending line 11 are made so that the basic portion 7, the connecting portion 9 and the extreme portion 8 are mutually inclined according to the first angle $\alpha$ and the second angle $\beta$.

The presence of the first bending line 10 and of the second bending line 11 facilitates the bending of the blade elements 3, when stressed, and their return to the non-deformed position, when the stress finishes.

Preferably, the basic element 2 and the blade elements 3 are made in a single monolithic body piece.

In other words, in a preferred embodiment, both the basic element 2 and the blade elements 3 are made of a substantially elastic material.

In this way, the basic element 2 is also elastically deformable and can adapt optimally to the holding surface S, regardless of its geometric conformation, thus adhering to the holding surface S itself in a substantially uniform manner.

Particularly, FIGS. 1 to 4 refer to a special use of the deterrent 1 wherein the holding surface S is substantially flat.

Figure 5:
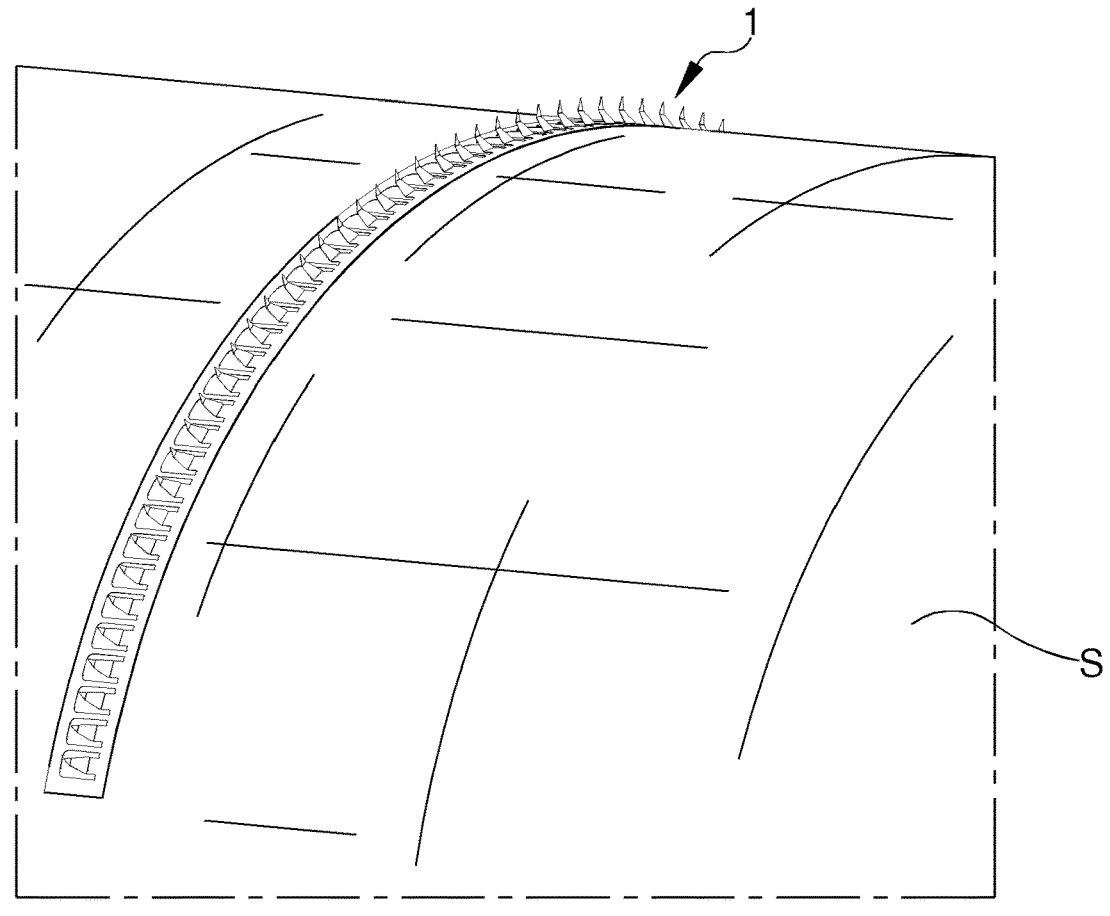
FIG. 5 is an axonometric view of the deterrent according to the invention in a special assembly configuration.

FIG. 5 shows the deterrent 1 in a different assembly configuration wherein the holding surface S has a substantially curvilinear conformation.

Again, the basic element 2 may bend by fitting the conformation of the holding surface S, thus adhering evenly thereto.

Conveniently, the basic element 2 comprises a plurality of pre-cut lines 12 made at a predefined distance and adapted to define portions of the basic element 2 removable by a user.

The pre-cut lines 12 are portions of the basic element 2 with a weakened section which can be used to divide the basic element 2 into portions of varying lengths based on, e.g., the size of the holding surface S and/or other installation requirements.

Particularly, it is possible to divide the basic element 2 along the pre-cut lines 12 either manually or by employing suitable working tools.

The process for making the deterrent 1 comprises at least the phases of:

- providing at least one slab made, at least partly, of a substantially elastic material;
- engraving the slab to obtain the basic element 2;
- engraving the basic element 2 to obtain a plurality of openings, substantially arranged side by side, and a plurality of closure elements of the openings, associated with the basic element 2 at the point where at least one relevant perimeter edge is located;
- removing the excess material from the closure elements to obtain the blade elements 3, each of the blade elements 3 being obtainable from a relevant closure element and each of the perimeter edges comprising a relevant first end 4;
- bending the blade elements 3 to obtain the first bending line 10 and the second bending line 11.

Initially, the slab provided is engraved and the outer perimeter of the basic element 2 is defined and, then, the excess material is removed from the basic element 2, thus making a plurality of openings and the relevant closure elements, which are substantially coplanar to the basic element 2.

Next, the outer perimeter of the closure elements is shaped, through the relevant engraving, thus defining the outer perimeter of the blade elements 3.

At this point, the first bending line 10, which defines the basic portion 7, is made, followed by the second bending line 11, which defines the extreme portion 8 and, together with the first bending line 10, the connecting portion 9.

Particularly, the first bending line 10 and the second bending line 11 are made so that the connecting portion 9 is inclined by the first angle α with respect to the basic portion 7 and the extreme portion 8 is inclined by the second angle β with respect to the connecting portion 9, both of which are substantially 45° in width.

Conveniently, the process according to the invention comprises at least one phase of making a plurality of weakening lines of the section of the basic element 2 to define the pre-cut lines 12.

The operation of the deterrent according to the invention is as follows.

The deterrent 1 is associated with the holding surface S that is to be protected from the bird P.

In the absence of external stresses, the deterrent 1 remains in the home configuration, wherein the blade elements 3 are not bent.

In the event of the bird P resting on the blade elements 3, the latter bend elastically, place the deterrent 1 in the working configuration and the pointed elements 6 contact the bird P by stinging it.

Under these conditions, the bird P rests on an inclined surface with respect to the holding surface S which, together with the presence of the pointed elements 6, makes it uncomfortable and inconvenient for the bird P to remain on the deterrent 1.

As soon as the bird P rises in flight from the deterrent 1, the blade elements 3 return to the released position, thus placing the deterrent 1 in the home configuration.

It has, in practice, been ascertained that the described invention achieves the intended objects.

Particularly, the deterrent according to the invention enables an effective response to the health, environmental and aesthetic problem caused by bird droppings on buildings and/or artistic artifacts.

Specifically, the special expedient of making the blade elements of substantially elastic material, together with the presence of pointed elements, allows the definition of an uncomfortable resting surface for the birds resulting in their flight away.

Additionally, the fact that the basic element is also made of substantially elastic material, together with the presence of the pre-cut lines, facilitates the installation of the deterrent itself on any resting surface, regardless of its relevant size and geometric conformation (e.g. curvilinear surfaces).

In addition, the particular type of material from which the deterrent is made according to the invention allows the deterrent itself to provide high resistance to weathering and/or bird droppings, thus reducing the extent and frequency of the relevant maintenance work.

The invention claimed is:

1. A bird deterrent comprising:
supporting means associable with a holding surface; and
a plurality of blade elements arranged substantially side by side, made at least partly of substantially elastic material and comprising at least a first end, associated with said supporting means, and at least a second free end provided with at least one pointed element;
wherein said blade elements are flexible in a substantially elastic manner as a result of the support of at least one bird or at least one animal and
wherein each of said plurality of blade elements comprises:
at least one basic portion, provided with said first end, and substantially coplanar to at least one basic element;
at least one extreme portion provided with said second end and with said pointed element;
at least one connecting portion between said basic portion and said extreme portion;
wherein said connecting portion is inclined with respect to said basic portion by a first angle, substantially equal to 45°, and said extreme portion is inclined with respect to said connecting portion by a second angle, substantially equal to 45°.

2. The bird deterrent according to claim 1, wherein said substantially elastic material is of a metallic type.

3. The bird deterrent according to claim 2, wherein said substantially elastic material is hardened steel.

4. The bird deterrent according to claim 1, wherein said at least one basic element and said plurality of blade elements are made in a single monolithic body piece.

5. The bird deterrent according to claim 1, wherein each of said plurality of blade elements comprises:
at least a first bending line, positioned between said basic portion and said connecting portion; and
at least a second bending line, positioned between said connecting portion and said extreme portion;
wherein said first bending line and said second bending line are adapted to promote bending of said plurality of blade elements when contacted by said at least one bird or by said at least one animal.

6. The bird deterrent according to claim 1, wherein said at least one basic element comprises a plurality of pre-cut lines made at a predefined distance and adapted to define portions of said at least one basic element removable by a user.

7. An animal deterrent comprising:
a supporting structure associable with a holding surface, wherein said supporting structure comprises at least one basic element; and a plurality of blade elements arranged substantially side by side, made at least partly of substantially elastic material and comprising at least a first end, associated with said supporting structure, and at least a second free end provided with at least one pointed element, wherein said blade elements are flexible in a substantially elastic manner, and wherein each of said plurality of blade elements comprises:

at least one basic portion, provided with said first end, and substantially coplanar to said at least one basic element;

at least one extreme portion provided with said second end and with said pointed element;

at least one connecting portion between said basic portion and said extreme portion;

wherein said connecting portion is inclined with respect to said basic portion by a first angle, substantially equal to 45°, and said extreme portion is inclined with respect to said connecting portion by a second angle, substantially equal to 45°.

* * * * *